US011970946B2

(12) United States Patent
Packer et al.

(10) Patent No.: US 11,970,946 B2
(45) Date of Patent: Apr. 30, 2024

(54) CLEARANCE CONTROL ASSEMBLY

(71) Applicant: General Electric Company, Schenectady, NY (US)

(72) Inventors: Travis J. Packer, Lebanon, OH (US); James Hamilton Grooms, Hamilton, OH (US); David Fasig, Stevensville, MD (US); Richard William Jendrix, Liberty Township, OH (US); Scott Alan Schimmels, Miamisburg, OH (US); Bradford Alan Tracey, Cold Spring, KY (US); Michael Alan Hile, Cincinnati, OH (US); Thomas Ryan Wallace, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 17/388,228

(22) Filed: Jul. 29, 2021

(65) Prior Publication Data

US 2023/0035302 A1 Feb. 2, 2023

(51) Int. Cl.
*F01D 11/24* (2006.01)
*F01D 9/02* (2006.01)
*F01D 25/24* (2006.01)

(52) U.S. Cl.
CPC ................ *F01D 11/24* (2013.01); *F01D 9/02* (2013.01); *F01D 25/243* (2013.01); *F05D 2240/126* (2013.01); *F05D 2240/55* (2013.01)

(58) Field of Classification Search
CPC ........ F01D 11/005; F01D 11/24; F01D 25/14; F01D 25/24; F01D 25/243; F01D 25/28; F05D 2240/126
See application file for complete search history.

(56) References Cited

U.S. PATENT DOCUMENTS 3,075,744 A 1/1963 Peterson
5,165,847 A 11/1992 Proctor et al.
6,139,257 A 10/2000 Proctor et al.
7,740,444 B2 6/2010 Lee et al.
7,823,389 B2 11/2010 Seitzer et al.
7,946,801 B2 5/2011 Shapiro et al.
8,221,061 B2 * 7/2012 Massot .................. F01D 11/24 415/173.2
10,704,419 B2 7/2020 Bassery et al.
(Continued)

*Primary Examiner* — Woody A Lee, Jr.
*Assistant Examiner* — Cameron A Corday
(74) *Attorney, Agent, or Firm* — Dority & Manning, P.A.

(57) ABSTRACT

A clearance control assembly for a gas turbine engine that defines an axial direction and a radial direction and includes a stage of rotor blades and a shroud hanger. The assembly includes a case configured to be positioned outward along the radial direction from the stage of rotor blades when installed in the gas turbine engine. The case is further configured to be engaged with the shroud hanger at a first location when installed in the gas turbine engine. The assembly also includes a baffle positioned outward along the radial direction from the case to define a chamber therebetween. The baffle has a forward end and an aft end. The forward end of the baffle is engaged with the case to form a first seal and the aft end of the baffle is engaged with the case to form a second seal. The baffle, the case, or both define an inlet to allow a fluid to enter the chamber and the case defines an outlet to allow the fluid to exit the chamber.

12 Claims, 5 Drawing Sheets

(56) References Cited

U.S. PATENT DOCUMENTS

| | | | | |
|---|---|---|---|---|
| 2008/0112797 | A1* | 5/2008 | Seitzer .................... | F01D 11/24<br>415/175 |
| 2016/0123186 | A1 | 5/2016 | Stover et al. | |

* cited by examiner

CLEARANCE CONTROL ASSEMBLY

FEDERALLY SPONSORED RESEARCH

This invention was made with government support. The U.S. government may have certain rights in the invention.

FIELD

The present disclosure generally relates to gas turbine engines. More specifically, the present disclosure relates to a clearance control assembly for a gas turbine engine.

BACKGROUND

In a gas turbine engine, air is pressurized in a compressor and mixed with fuel in a combustor for generating hot combustion gases. Energy is extracted from the gases in a high pressure turbine (HPT) that is joined by a drive shaft to the compressor.

In a typical turbofan aircraft engine, a fan is mounted upstream from the compressor and is powered by a low pressure turbine (LPT) mounted downstream of the HPT. In marine and industrial (M & I) applications, the LPT may power an external drive shaft for powering a propulsion system or electrical generator.

The compression and combustion cycles introduce energy into the pressurized air, with energy extracted from the combustion gases in the turbine stages. Since the HPT is subject to the hottest combustion gases discharged from the combustor, the various components of the HPT are typically cooled by bleeding a portion of the pressurized air from the compressor.

The LPT and HPT can include a stage of turbine rotor blades that extend radially from a supporting rotor disk, with the radially outer tips of the blades being mounted inside a surrounding shroud. The shroud is stationary and supported from a surrounding annular case for maintaining a small radial clearance or gap between the tips of the rotor blades and the shroud.

The turbine blades share a common airfoil profile which is generally designed to maximize the efficiency of energy extraction from the combustion gases. Leakage of the combustion gases at the blade tip gaps can decrease efficiency of the engine. Accordingly, the radial blade tip clearance is made as small as practical but cannot be too small or undesirable rubbing of the blade tips against the turbine shroud can lead to undesirable damage or shortened component life.

In order to avoid undesirable blade tip rubs against the shroud, the blade tip clearance must be sufficiently large. However, in order to increase an overall efficiency of the engine, the blade tip clearance should be minimized. Therefore, clearance control assemblies can be provided to assist with managing the clearance between blade tips and the surrounding shroud during the various power settings and flight conditions. The inventors of the present disclosure have come up with various configurations and devices to improve on currently known clearance control assemblies.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
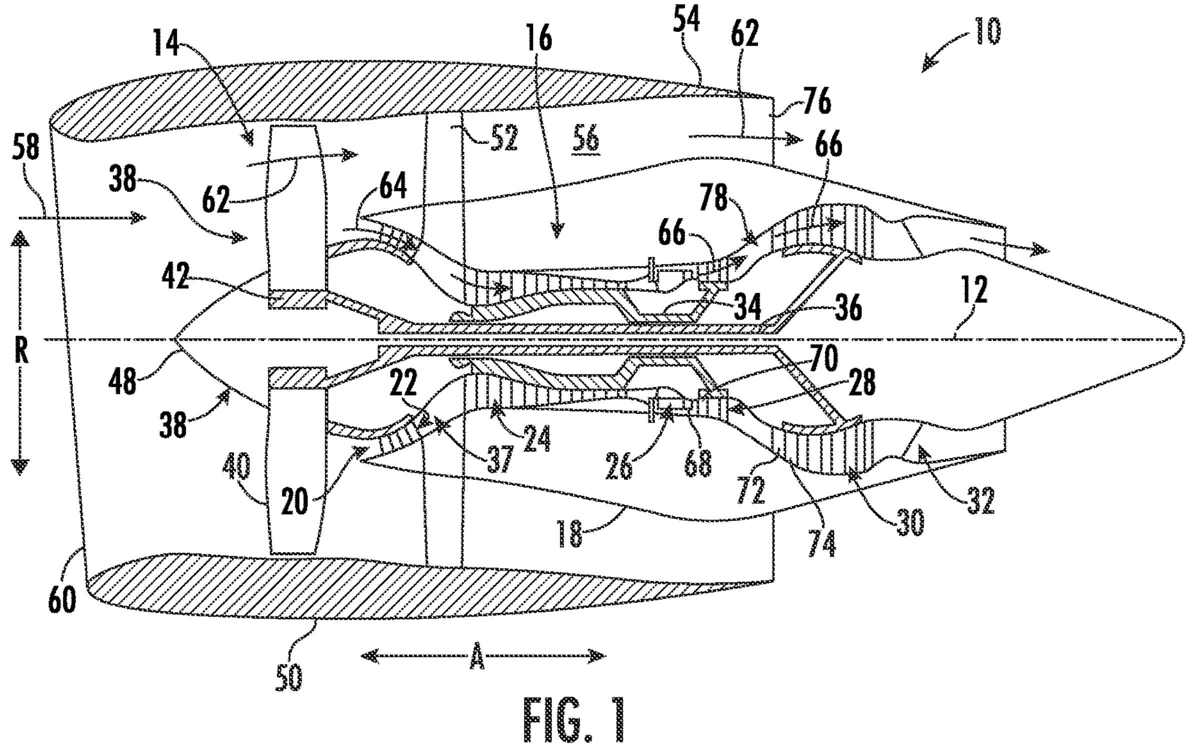
FIG. 1 is a cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fluid" may be a gas or a liquid. The term "fluid communication" means that a fluid is capable of making the connection between the areas specified.

The terms "coupled," "fixed," "attached to," and the like refer to both direct coupling, fixing, or attaching, as well as indirect coupling, fixing, or attaching through one or more intermediate components or features, unless otherwise specified herein. Similarly, the term “engaged” refers to direct engagement or engagement through one or more intermediate components or features, unless otherwise specified herein.

The singular forms “a”, “an”, and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a gas turbine engine can be equipped with one or more clearance control assemblies. The clearance control assembly can be provided to optimize, maintain, or adjust a clearance between a rotor blade tip and a shroud. The clearance control assembly can optimize, maintain, or adjust a clearance by adjusting the amount of a relatively cool fluid that is provided to a case that surrounds the shroud. The clearance control assembly can passively optimize, maintain, or adjust the clearance by reducing the thermal capacity mismatch and optimize the thermal time constant between the stage of rotor blades and the stationary shroud so that the clearance between the stage of rotor blades and the shroud can be passively controlled. Equipping a gas turbine engine with the clearance control assembly can have the benefit of increasing the efficiency of the engine by reducing the clearance between the rotor blade tip and the shroud. Improving the efficiency of the engine can result in the additional benefits of additional power output and lower fuel consumption of the engine. Additionally, equipping a gas turbine engine with the clearance control assembly has the benefit of reducing the likelihood that the rotor blades will make contact with the shroud, causing damage to the engine. Also, equipping a gas turbine engine with the clearance control assembly allows for the clearance between the rotor blades and the shroud to be passively controlled when an active clearance control system fails.

In at least one embodiment, the clearance control assembly includes a case configured to be positioned outward along the radial direction from a stage of rotor blades when installed in the gas turbine engine. The case is further configured to be engaged with a shroud hanger at a first location when installed in the gas turbine engine. The clearance control assembly further includes a baffle positioned outward along the radial direction from the case to form a chamber between the baffle and the case. The baffle has a forward end and an aft end. The forward end of the baffle is engaged with the case to form a first seal, and the aft end of the baffle is engaged with the case to form a second seal. The baffle or the case defines an inlet to allow a fluid to enter the chamber and the case defines an outlet to allow the fluid to exit the chamber.

As will be appreciated from the discussion herein, engaging the forward end of the baffle with the case to form the first seal and engaging the aft end of the baffle with the case to form the second seal causes the chamber to be both axially and radially sealed. The axial and radial sealing has the benefit of allowing the fluid that enters the chamber to impinge and move along the case until it exits the chamber, which may increase that amount of cooling of the case and the shroud, via convection. Additionally, it can provide a more uniform cooling of the case. Also, this configuration allows sealing during all missions with low stress.

In at least one embodiment, the outlet, which is defined by the case, is positioned to allow the fluid to exit the chamber at a location aft of the first location. This configuration has the additional benefit of cooling the components, such as a subsequent nozzle, that are aft of the stage of rotor blades.

In at least one embodiment, the first seal comprises a first rope seal element positioned between the forward end of the baffle and the case, and the second seal comprises a second rope seal element positioned between the aft end of the baffle and the case. This configuration has the additional benefit of increasing the sealing effect at the location of the first seal and the second seal, which may further increase the cooling of the case and the shroud, via convection. Additionally, because less fluid undesirably escapes the system, this may further increase the amount of fluid exiting the outlet, which can further increase the cooling of components, such as a subsequent nozzle, that are aft of the stage of rotor blades.

In at least one embodiment, the forward end or the aft end of the baffle engage with a flange that extends radially outward from the case to form at least in part the first seal or the second seal. This configuration has the additional benefit of increasing the sealing effect at the location of the first seal and the second seal, which may further increase the cooling of the case and the shroud, via convection. Additionally, because less fluid undesirably escapes the system, this may further increase the amount of fluid exiting the outlet, which can further increase the cooling of components, such as a subsequent nozzle, that are aft of the stage of rotor blades.

In at least one embodiment, the shroud hanger has an aft hook that is configured to mate with a corresponding feature of the case, the first location being the location where the aft hook of the shroud hanger mates with the corresponding feature of the case. This configuration has the additional benefit of cooling components, such as a subsequent nozzle, that are aft of the stage of rotor blades.

In at least one embodiment, the chamber extends continuously from the forward end of the baffle to the aft end of the baffle. This configuration has the additional benefit of increasing the amount of the case's surface area that is cooled, which may increase the cooling of the shroud.

In at least one embodiment, the clearance control assembly includes a conductive element positioned on an outer surface of the case and within the chamber. This configuration has the additional benefit of the ability to set the time constant of the case to match the time constant of the stage of rotor blades by adjusting the mass thickness of the conductive element in the axial, radial, and/or circumferential direction. Matching the time constants can increase the ability of the clearance control assembly to passively control the clearance between the tips of the rotor blades and the shroud.

In at least one embodiment, the case has a flange that extends radially outward and is located between the forward end of the baffle and the aft end of the baffle. This configuration has the additional benefit of the ability to set the time constant of the case to match the time constant of the stage of rotor blades by adjusting the mass of the flanges in the axial, radial, and/or circumferential direction. Matching the time constant of the case to match the time constant of the stage of rotor blades allows the clearance between the stage of rotor blades and the shroud can be passively controlled. Additionally, this configuration increases the surface area of the case, which allows the case to be cooled quicker, which allows the shroud to be cooled quicker.

In at least one embodiment, the flange has a depression located near a root end of the flange. This configuration has the additional benefit of reducing conduction into the flanges, which makes them more iso-thermal, or uniform in temperature. Making the flanges more iso-thermal, or uniform in temperature, can enhance case roundness and can reduce the thermal growth of the case. Reducing the thermal growth of the case can reduce the thermal capacity mismatch and optimize the thermal time constant between the stage of rotor blades and the stationary shroud so that the clearance between the stage of rotor blades and the shroud can be passively controlled.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference), a radial direction R, and a circumferential direction C. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52. Moreover, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft 36 and fan section 14, etc. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
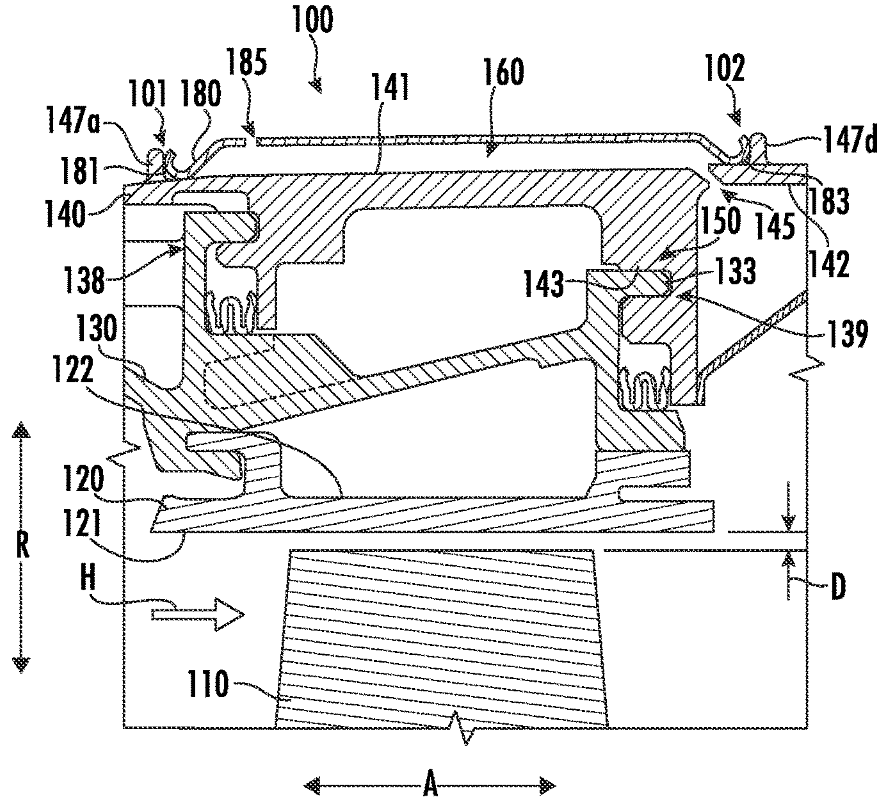
FIG. 2 is a cross-sectional view of a clearance control assembly in accordance with an exemplary aspect of the present disclosure.

FIG. 2 is a cross-sectional view of a clearance control assembly 100 in accordance with an exemplary embodiment of the present disclosure. The clearance control assembly 100 includes a case 140 that is configured to be positioned outward along the radial direction R from a stage of rotor blades 110 when installed in a gas turbine engine, such as the gas turbine engine of FIG. 1. The case 140 is further configured to be engaged with a shroud hanger 130 at a first location 150. In this example, the first location 150 is the aft-most location where the case 140 and the shroud hanger 130 mate. More specifically, the first location 150 is where the aft hook 133 of the shroud hanger 130 mates with a corresponding feature 143 of the case 140, in this example. The case 140 can also be engaged with other portions of the shroud hanger 130, such as a forward end 138 of the shroud hanger 130.

The shroud hanger 130 can be engaged with a shroud 120. In at least one example, the shroud 120 and the shroud hanger 130 are a unitary component; however, as depicted, the shroud 120 and shroud hanger 130 can be two separate components. The shroud 120 and shroud hanger 130 can extend circumferentially around an axis defined by the engine, such as longitudinal centerline 12 of engine 10. The engine may include multiple shroud 120 assemblies, which include a shroud 120 and a shroud hanger 130, that extend around the circumference defined by the stage of rotor blades 110.

The shroud 120 has a hot side 121 in thermal communication with a hot combustion gas flow H, such as hot gas emitted from the combustor, and a cold side 122 that is opposite of the hot side 121. The shroud 120 is mounted stationary in the engine and surrounds the radially outer tips of the stage of rotor blades 110. The shroud 120 can be spaced from the tips of the rotor blades 110 to define a radial clearance D.

The clearance control assembly 100 also includes a baffle 180 that is positioned outward along the radial direction R from the case 140 to form a chamber 160 therebetween. The baffle 180 can be manufactured from sheet metal and can be rolled to the desired shape. The baffle 180 has a forward end 181 and an aft end 183 that are each engaged with the case 140. The forward end of the baffle 180 is engaged with the case 140 to form a first seal 101, and the aft end of the baffle 180 is engaged with the case 140 to form a second seal 102. The first seal 101 and the second seal 102 can prevent fluid from escaping the chamber at the locations of the first seal 101 and the second seal 102.

In this example, the chamber 160 extends continuously from the forward end 181 of the baffle 180 to the aft end 183 of the baffle 180. Additionally, the chamber 160 extends continuously in a circumferential direction C around the case 140. In this way, the chamber 160 is substantially cylinder shaped with a tapered rim.

Still referring to the example of FIG. 2, both the forward end 181 and the aft end 183 of the baffle 180 each engage with a flange 147*a*, 147*d* that extends radially outward from the case 140 to form at least in part the first seal 101 or the second seal 102. However, in other examples, only one of the forward end 181 or the aft end 183 of the baffle 180 engage with a flange 147 that extends radially outward from the case 140 to form at least in part the first seal 101 or the second seal 102. The baffle 180 can induce a spring force against the flange 147 to form the first seal 101 or the second seal 102. The spring force can be induced in the axial direction A against the flange 147.

The baffle 180 defines an inlet 185 to allow a fluid, such as air bled from the compressor section of the engine or air from bypass airflow passage 56, to enter the chamber 160. The inlet 185 can be an impingement inlet 185 to provide a discrete jet of impingement fluid to the chamber 160 and onto an outer surface 141 of the case 140 along the radial direction R. The fluid upstream from the inlet 185 can be at a higher pressure than the fluid downstream from the inlet 185 and within the chamber 160. As such, when the fluid exits the inlet 185, the fluid expands and is cooled.

The baffle 180 can define a plurality of inlets 185 that extend circumferentially around the baffle 180. Each of the plurality of inlets 185 can be arranged at the same axial location; however, in other examples, the inlets 185 can be arranged so that they are arranged at different axial locations. For example, the inlets 185 can be in staggered locations around the baffle 180. In this example, the inlet 185 is located proximate to a forward end 181 of the baffle 180. Such a configuration may allow for cooling along a greater length of the case 140.

However, in other exemplary embodiments of the present disclosure, other configurations exist; for example, the inlet 185 can be located proximate a center of the baffle 180 to, e.g., concentrate cooling on the center and aft portions of the case. In another example, the inlet 185 can be located proximate to an aft end 183 of the baffle 180 to, e.g., concentrate cooling on an aft portion of the case 140, as may be desirable for certain hanger configurations. In yet other examples, an inlet 185 can be provided proximate to a forward end 181 of the baffle 180 and another inlet 185 can be provided proximate to a center of the baffle 180 (see other examples below).

The term "proximate" as used throughout means that the element is closest in relationship to the specified location. For example, proximate to a forward end means that it is closer to the forward end than to the center and aft end; proximate to a center means that it is closer to a center than the forward and aft ends.

In this example, the case 140 defines an outlet 145 to allow the fluid to exit the chamber 160. Also, in this example, the outlet 145 is positioned aft of the first location 150 and extends from an outer surface 141 of the case to an inner surface of the case. In some examples, the pressure of the fluid within the chamber 160 is higher than the pressure of the fluid that is downstream from the outlet 145. As such, when the fluid exits the chamber 160 through the outlet 145, the fluid quickly expands and cools.

As shown, the outlet 145 extends through the case 140 at an obtuse angle in relation to the surface of the case 140 that is facing the chamber 160. However, in other examples, the outlet 145 extends through the case 140 at a perpendicular angle, and in yet other examples, the outlet 145 extends through the case 140 at an acute angle in relation to the surface of the case 140 that is facing the chamber 160. In this example, having the outlet 145 positioned to allow the fluid to exit the chamber 160 at a location aft of the first location 150 can provide additional cooling to the first location 150. For example, when the first location 150 is the aft-most location where the case 140 and the shroud hanger 130 mate, the outlet 145 can provide additional cooling to the aft-most location where the case 140 and the shroud hanger 130 mate. Also, additional cooling can be provided to a subsequent nozzle (not shown). The pressure of the fluid within the chamber 160 can be greater than the pressure of the fluid within the cavity that is located aft of the first location 150. Therefore, when the fluid exits the chamber 160, the pressure of the fluid is quickly reduced, expanding the fluid, which causes the temperature of the fluid to be reduced.

It will be appreciated, however, that in other examples, the outlet 145 may be positioned at other suitable locations for other desired benefits. For example, in other embodiments, the outlet 145 may alternatively extend through the baffle 180.

The case 140 can define a plurality of outlets 145 that are spaced circumferentially around the case 140. Each of the plurality of outlets 145 can be arranged at the same axial location; however, in other examples, the outlets 145 can be arranged so that they are arranged at different axial locations. For example, the outlets 145 can be in staggered locations around the case 140.

As mentioned, different thermal expansion rates between the rotor blades and the shroud 120 can change the radial clearance D during the various modes of operation of the gas turbine engine. Therefore, the clearance control assembly 100 can selectively cool or heat the case 140, shroud hanger 130, and shroud 120 to adjust the radial clearance D. For example, because the case 140 is engaged with the shroud hanger 130, which is either engaged with the shroud 120 or a unitary component with the shroud 120, the selective cooling or heating of the case 140 also selectively cools or heats the shroud 120, e.g., via conduction. The selective cooling or heating of the shroud 120 can affect the radial clearance D. More specifically, cooling the case 140 can cause thermal shrinkage of the case 140, shroud hanger 130, and shroud 120, which decreases the radial clearance D. Allowing the case 140 to heat can cause thermal expansion of the case 140, shroud hanger 130, and shroud 120, which increases the radial clearance D.

In operation, a fluid, such as air bled from the compressor section of the engine or air from bypass airflow passage 56, enters the chamber 160 through the inlet 185 of the baffle 180. In order to cool the shroud 120, the fluid is at a temperature less than the temperature of the shroud 120. The relatively cool fluid is directed toward the outer surface 141 of the case 140, which cools the case 140 and also cools the shroud hanger 130 and shroud 120, via conduction. The fluid then exits the chamber 160 through the outlet 145. In order to heat the shroud 120, or rather increase a temperature of the shroud 120, the amount of relatively cool fluid provided to the chamber 160 is reduced.

Figure 3:
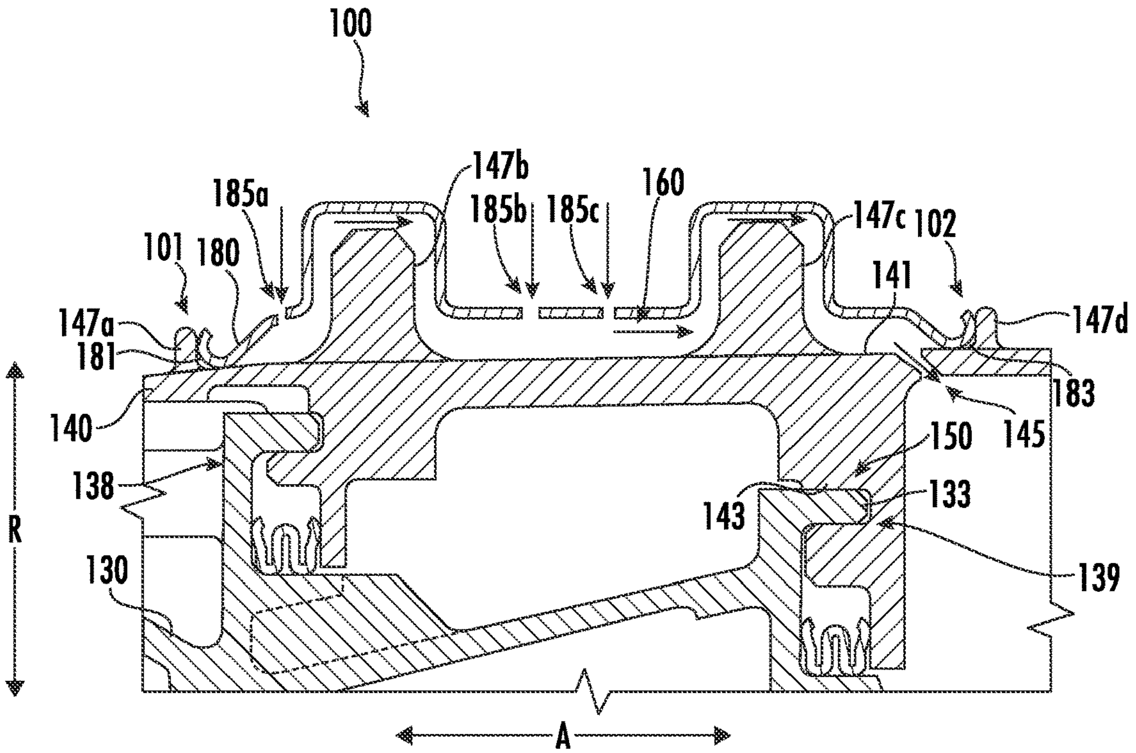
FIG. 3 is a cross-sectional view of a clearance control assembly in accordance with an exemplary aspect of the present disclosure.

FIG. 3 is a cross-sectional view of a clearance control assembly 100 in accordance with another exemplary embodiment of the present disclosure. The assembly of FIG. 3 is substantially similar to the assembly of FIG. 2, and like elements will be identified with the same reference numerals. The assembly of FIG. 3 is different from the assembly of FIG. 2, however, in that the case 140 includes a first flange **147*b* and a second flange 147*c* located within the chamber 160. Additionally, the baffle 180 is shaped to conform to an outer dimensional shape of the case 140. In this example, the baffle 180 is spaced from the case 140 from the forward end 181 to the aft end 183 so that the baffle 180 does not make contact with the case 140, other than at the locations of the first seal 101 and the second seal 102. The distance from the baffle 180 to the case 140 can vary. For example, and as shown, the flanges 147*b* and 147*c* each define a tip end at an outer location along the radial direction R. A distance from the tip ends of the flanges 147*b*, 147*c* to the baffle 180 may be less than a distance from the case 140 to the center of the baffle 180. In other examples, the distance from the baffle 180 to the case 140 is constant the entire length the baffle 180, with the exception of the forward end 181 and aft end 183**.

The case 140 can include more than two flanges 147. For example, the case 140 can include three, four, six, or more flanges 147. The case 140 can also include one flange 147. Each flange 147 can extend continuously around the case 140 in a circumferential direction C to strengthen the case 140. However, in other examples, the flange 147 may only extend partially around the case 140.

With the flanges 147 located within the chamber 160, the fluid flowing through the chamber 160 can take a serpentine-shaped path axially through the chamber 160. Additionally, as shown, the baffle 180 depicted in FIG. 3 may define a plurality of inlets 185 spaced along the axial direction A. In particular, the exemplary baffle 180 depicted defines an inlet **185*a* located proximate a forward end of the baffle 180 and two additional inlets 185*b* and 185*c* located proximate a center of the baffle 180. Additionally, even though not shown in the cross-sectional view, a plurality of inlets 185*a*, 185*b*, 185*c* can extend circumferentially around the baffle 180** at or around the same axial location.

The flanges 147 can increase a mass and surface area of the case 140. Increasing the mass and surface area of the case 140 can decrease the thermal capacity mismatch between the stage of rotor blades 110 and the stationary shroud 120. The reduction of thermal capacity mismatch can optimize the thermal time constant between the stage of rotor blades 110 and the stationary shroud 120 so that the clearance D between the stage of rotor blades 110 and the shroud 120 can be passively controlled.

Figure 4:
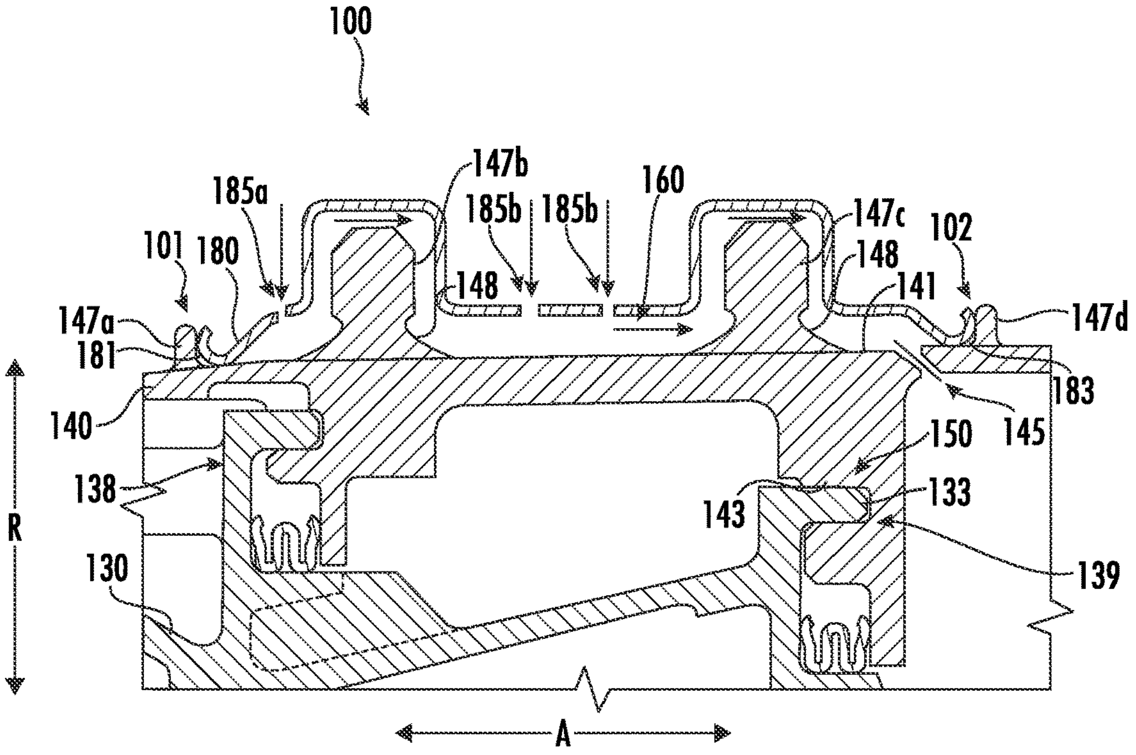
FIG. 4 is a cross-sectional view of a clearance control assembly in accordance with an exemplary aspect of the present disclosure.

Referring now to FIG. 4 a cross-sectional view is provided of a clearance control assembly 100 in accordance with yet another exemplary embodiment of the present disclosure. The assembly of FIG. 4 is substantially similar to the assembly of FIG. 3, and like elements will be identified with the same reference numerals. The assembly of FIG. 4 is different from the assembly of FIG. 3, however, in that the first and second flange **147*b*, 147*c* that are located within the chamber 160 have a depression 148 located near a root end of the flange 147 (i.e., an inner end along the radial direction R where the flange 147*b*, 147*c* meets the outer surface 141 of the case 140). In this example, the depression 148 is a scallop that is located near the underside of the flanges 147**.

Incorporating a depression 148 into the flanges 147 can reduce conduction into the flanges 147, which makes them more iso-thermal, or uniform in temperature. Making the flanges 147 more iso-thermal, or uniform in temperature, can enhance case roundness and can reduce the thermal growth of the case 140. Reducing the thermal growth of the case 140 can reduce the thermal capacity mismatch and optimize the thermal time constant between the stage of rotor blades 110 and the stationary shroud 120 so that the clearance D between the stage of rotor blades 110 and the shroud 120 can be passively controlled.

Figure 5:
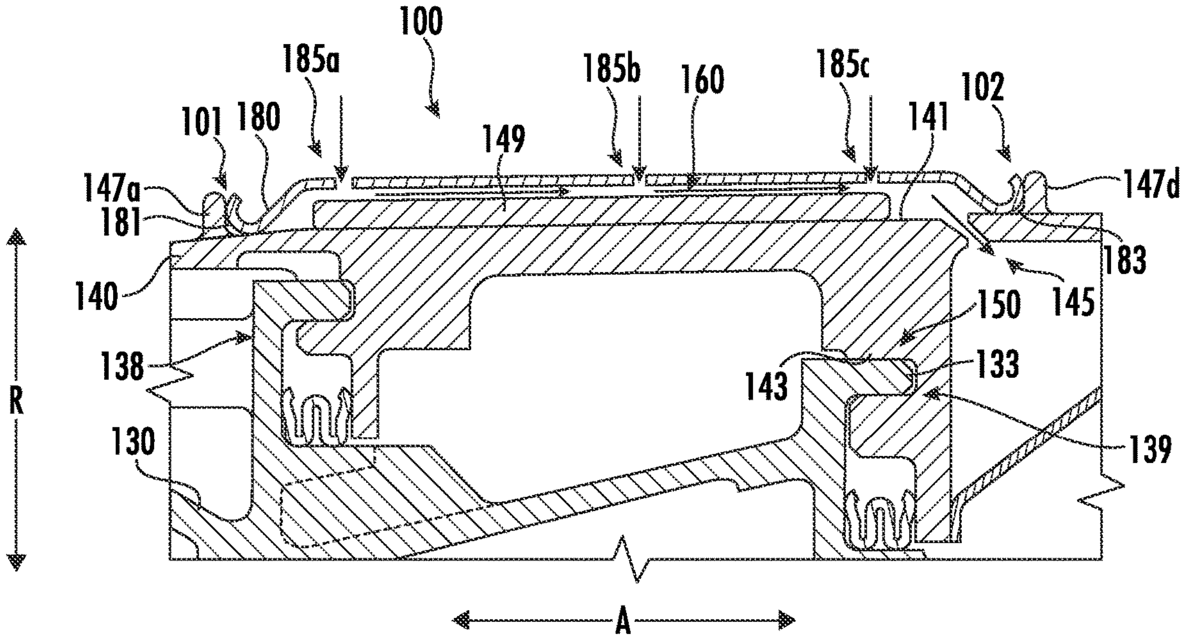
FIG. 5 is a cross-sectional view of a clearance control assembly in accordance with an exemplary aspect of the present disclosure.

FIG. 5 is a cross-sectional view of a clearance control assembly 100 in accordance with still another exemplary embodiment of the present disclosure. The assembly of FIG. 5 is substantially similar to the assembly of FIG. 2, and like elements will be identified with the same reference numerals. The assembly of FIG. 5 is different from the assembly of FIG. 2, however, in that a conductive element 149 is positioned on an outer surface 141 of the case 140 and within the chamber 160. The conductive element 149 can be configured to increase the time constant of the case 140 to be closer to, or match, the time constant of the stage of rotor blades 110. Designing the time constant of the case 140 to match, or be closer to, the time constant of the stage of rotor blades 110 can be accomplished by adjusting a mass thickness of the conductive element 149 in the axial, radial, and/or circumferential direction C.

The conductive element 149 may be formed of a material different from the material of the case 140. Alternatively, the conductive element 149 may be formed of the same material as the case 140. The conductive element 149 can be a unitary component with the case 140. The conductive element 149 may be formed of a metal or metal alloy, or any other material with a relatively high thermal capacitance to facilitate heat being conductively transferred to or from the conductive element 149. For example, in certain exemplary aspects, the conductive element 149 may be a nickel or cobalt based alloy. In other examples, conductive element 149 may define a thermal capacitance that is the same or similar to a nickel or cobalt based alloy.

In the example of FIG. 5, the baffle 180 defines an inlet 185*a* located proximate to the forward end 181 of the baffle 180, an inlet 185*b* located proximate to a center of the baffle 180, and an inlet 185*c* located proximate to an aft end 183 of the baffle 180. A plurality of inlets 185 can be spaced circumferentially around the baffle 180 at or around each of these axial locations.

Figure 6:
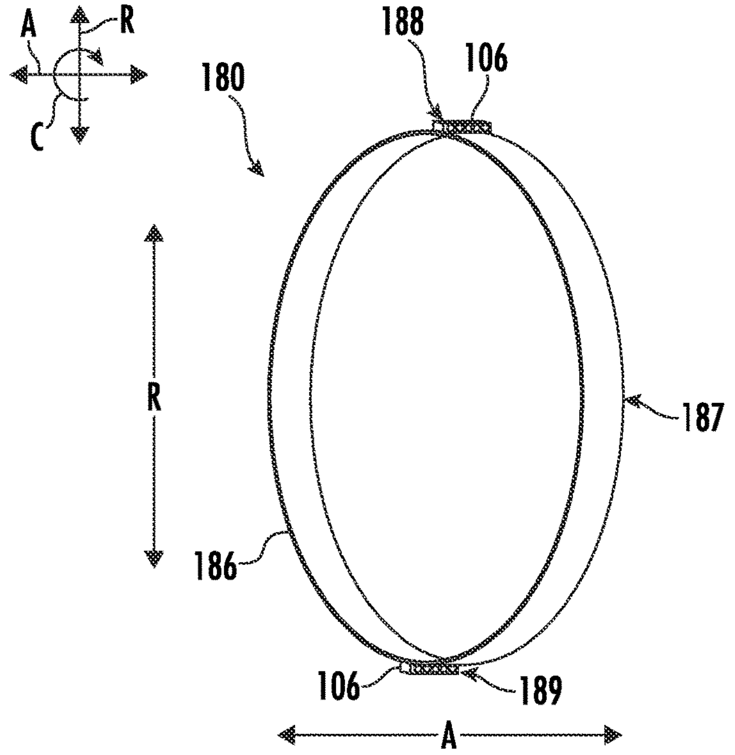
FIG. 6 is a perspective view of a clearance control assembly in accordance with an exemplary aspect of the present disclosure.
Figure 7:
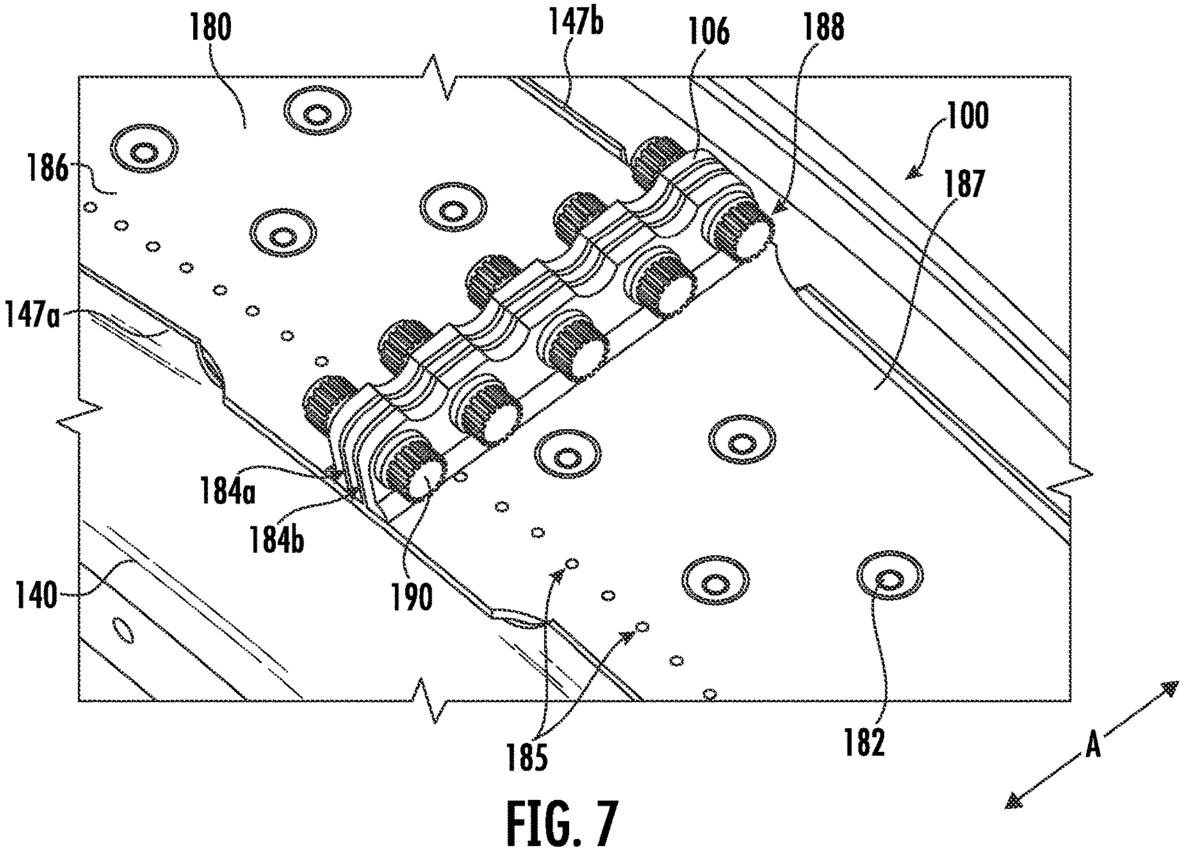
FIG. 7 is a perspective view of a portion of the clearance control assembly of FIG. 6 in accordance with an exemplary aspect of the present disclosure.
Figure 8:
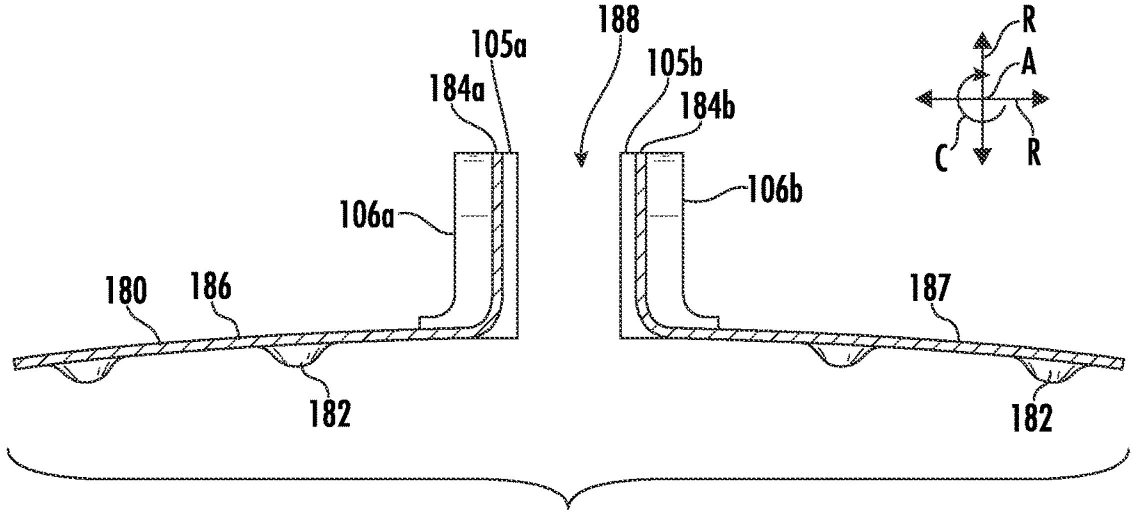
FIG. 8 is a side view of a portion of the clearance control assembly of FIG. 6 in accordance with an exemplary aspect of the present disclosure.

FIGS. 6 through 8 are views of a clearance control assembly 100 in accordance with an exemplary embodiment of the present disclosure. More particularly, FIG. 6 is a perspective view, FIG. 7 is a partial perspective view, and FIG. 8 is a partial side view of the clearance control assembly 100 in accordance with an exemplary embodiment of the present disclosure. The assembly of FIGS. 6 through 8 is similar to the assembly of FIG. 2, and like elements will be identified with the same reference numerals.

More specifically, referring first to FIG. 6, it will be appreciated that the clearance control assembly 100 includes a baffle 180 that extends substantially continuously along the circumferential direction C. In this example, the baffle 180 is a multi-piece design, having multiple sections, such as section 186 and section 187, attached to one another at a joint, such as joint 188 or joint 189. In particular, for the embodiment shown, the baffle 180 is a two-piece design, having a first section 186 and a second section 187 attached to one another at a first joint 188 and at a second joint 189.

Referring now particularly to FIG. 7, providing a close-up view of the first joint 188, it will be appreciated that the first section 186 of the baffle 180 includes a first flange 184*a* and the second section 187 of the baffle 180 includes a second flange 184*b*. For the embodiment shown, the first joint 188 is formed of the first and second flanges 184*a*, 184*b* of the first and second sections 186, 187, and more specifically is configured as a bolted connection, with the first and second flanges 184*a*, 184*b* of the first and second sections 186, 187 mechanically coupled through one or more fasteners 190, such as through one or more bolts.

More specifically, still, referring now briefly also to FIG. 8, providing a close-up view of a portion of the first joint 188 along the axial direction A, it will be appreciated that the exemplary embodiment of the assembly depicted further includes a first and second inner bracket 105*a*, 105*b* and a first and second outer bracket 106*a*, 106*b*. The inner brackets 105*a*, 105*b* and/or outer bracket 106*a*, 106*b* can improve radial sealing of the baffle 180. In particular, the first inner and outer brackets 105*a*, 106*a* are positioned on opposing sides of the first flange 184*a* of the first section 186 of the baffle, and the second inner and outer brackets 105*b*, 106*b* are positioned on opposing sides of the second flange 184*b* of the second section 187 of the baffle. The first and second inner and outer brackets 105, 106 may minimize a stress on the first and second flanges 184*a*, 184*b* of the baffle 180.

It will be appreciated, however, that the exemplary baffle depicted is provided by way of example only and in other embodiments a baffle may be provided attached in any suitable manner. For example, the baffle 180 may include any suitable number of sections attached in any suitable manner, such as through welding. However, fastening the sections, such as shown in FIG. 7, as opposed to welding, can reduce the amount of stress experienced by the location where adjacent sections meet.

Referring still to FIG. 7 and FIG. 8, the baffle 180, as shown, further includes a plurality of dimples 182. The dimples 182 may allow the baffle 180 to remain radially flat between the flanges 147*a* 147*b* and can additionally help reduce vibration of the baffle 180.

Figure 9:
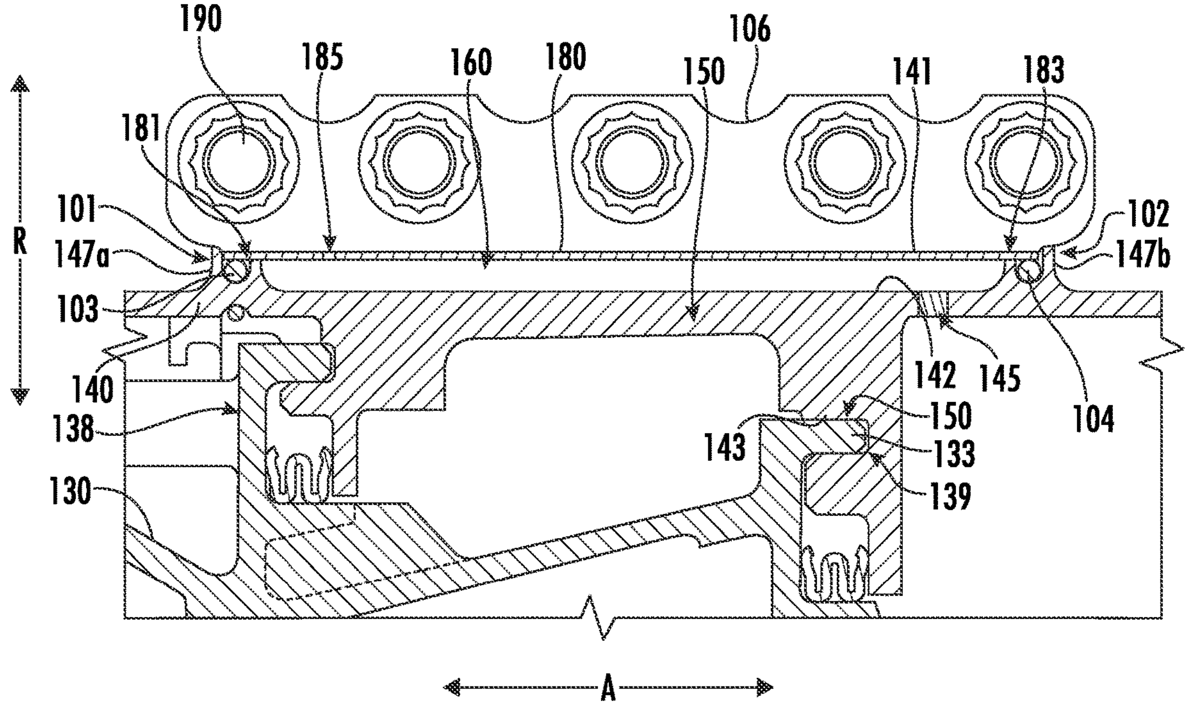
FIG. 9 is a side view of a portion of a clearance control assembly in accordance with an exemplary aspect of the present disclosure.

Referring now to FIG. 9, a side view of a portion of a clearance control assembly 100 in accordance with an exemplary aspect of the present disclosure is shown. As best seen in FIG. 9, in the embodiment shown, the first seal 101 includes a sealing element, and more specifically a first rope seal 103 element, positioned between the forward end 181 of the baffle 180 and the case 140, and the second seal 102 similarly includes a sealing element, and more specifically a second rope seal 104 element, positioned between the aft end 183 of the baffle 180 and the case 140. Additional flanges 147 that are located inward of the first rope seal 103 element and the second rope seal 104 element can be provided to keep the rope seal elements in place.

As shown, an inlet 185, which can be in impingement inlet 185, is located proximate to a forward end 181 of the baffle 180. A plurality of inlets 185 can be located circumferentially around the baffle 180 (FIG. 7). In other examples, inlets 185 may additionally or alternatively be located proximate to a center of the baffle 180 and/or the aft end of the baffle 180.

An outlet 145 is aft of the first location 150 and extend from an outer surface 141 of the case to an inner surface 142 of the case. A plurality of outlets 145 can be located circumferentially around the case 140. In this example, the outlet 145 extends through the case 140 at a perpendicular angle in relation to the outer surface 141 of the case 140 that is facing the chamber 160. However, in other examples, the outlet 145 extends through the case 140 at an obtuse angle, and in yet other examples, the outlet 145 extends through the case 140 at an acute angle in relation to the surface 141 of the case 140 that is facing the chamber 160.

Referring still generally to the embodiment of FIGS. 6 through 8 and the embodiment of FIG. 9, like the previous examples, the clearance control assembly 100 includes a case 140 that is configured to be positioned outward along the radial direction R from a stage of rotor blades 110 (not shown) when installed in a gas turbine engine, such as the gas turbine engine of FIG. 1. For example, referring back particularly to FIG. 7, the case 140 is further configured to be engaged with a shroud hanger 130 at a first location 150. In this example, the first location 150 is the aft-most location where the case 140 and the shroud hanger 130 mate. More specifically, the first location 150 is where the aft hook 133 of the shroud hanger 130 mates with a corresponding feature 143 of the case 140. The case 140 can also be engaged with other portions of the shroud hanger 130, such as a forward end of the shroud hanger 130. The shroud hanger 130 can be engaged with a shroud 120 (not shown).

The baffle 180 of the clearance control assembly 100 is positioned outward along the radial direction R from the case 140 to form a chamber 160 therebetween. The baffle 180 can be manufactured from sheet metal and can be rolled to the desired shape. The baffle 180 has a forward end 181 and an aft end 183 that are each engaged with the case 140. The forward end of the baffle 180 is engaged with the case 140 to form a first seal 101, and the aft end of the baffle 180 is engaged with the case 140 to form a second seal 102. In this example, the chamber 160 extends continuously from the forward end of the baffle 180 to the aft end of the baffle 180. Additionally, the chamber 160 extends continuously in a circumferential direction C around the case 140. In this way, the chamber 160 is substantially cylinder shaped with rounded edges on the inward side.

Figure 10:
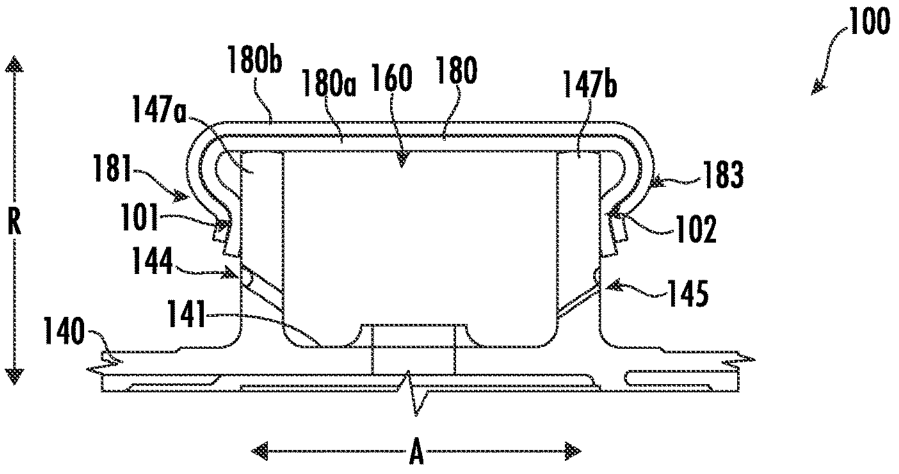
FIG. 10 is a cross-sectional view of a clearance control assembly in accordance with an exemplary aspect of the present disclosure.

FIG. 10 is a cross-sectional view of a clearance control assembly 100 in accordance with yet another exemplary embodiment of the present disclosure. The assembly of FIG. 10 is similar to the assembly of FIG. 2, and like elements will be identified with the same reference numerals. In this example, the clearance control assembly 100 includes a baffle 180 that is positioned outward along the radial direction R from the case 140 to form a chamber 160 therebetween. The baffle 180 has a forward end 181 and an aft end 183 that are each engaged with the case 140. The forward end 181 of the baffle 180 is engaged with a flange 147*a* of the case 140 to form a first seal 101, and the aft end 183 of the baffle 180 is engaged with a flange 147*b* of the case 140 to form a second seal 102. In this example, the chamber 160 extends continuously from the forward flange 147*a* to the aft flange 147*b*. Additionally, the chamber 160 extends continuously circumferentially around the case 140.

Both the forward end 181 and the aft end 183 of the baffle 180 each engage with a flange 147*a*, 147*b* that extends outward from the case 140 along the radial direction to form at least in part the first seal 101 or the second seal 102. The baffle 180 can induce an axial compression force against the flanges 147*a*, 147*b* to form the first seal 101 or the second seal 102. In this example, the baffle 180 is configured as a clip that induces a compression force onto the flanges 147*a*, 147*b*. Also, as shown, the baffle 180 is two discrete pieces 180*a*, 180*b* that are provided to increase the sealing of the first seal 101 and the second seal 102.

The forward flange 147*a* of the case 140 defines an inlet 144 to allow a fluid, such as air bled from the compressor section of the engine or air from bypass airflow passage 56, to enter the chamber 160. The inlet 144 can be an impingement inlet 144 to provide discrete jets of impingement fluid to the chamber 160 and onto the case 140. The forward flange 147*a* can define a plurality of inlets 144 that extend circumferentially around the case 140.

The aft flange 147*b* of the case 140 defines an outlet 145 to allow the fluid to exit the chamber 160. In this example, the outlet 145 is positioned to allow the fluid to exit the chamber 160 at a location aft of the first location 150 (not shown), which is where the case 140 engages with an aft end of a shroud hanger. As shown, the outlet 145 extends through the aft flange 147*b* of the case 140 at an obtuse angle in relation to the surface of the case 140 that is facing the chamber 160. However, in other examples, the outlet 145 extends through the aft flange 147 of the case 140 at a perpendicular angle, and in yet other examples, the outlet 145 extends through the aft flange 147 of the case 140 at an acute angle in relation to the surface of the case 140 that is facing the chamber 160. The case 140 can define a plurality of outlets 145 that extend circumferentially around the case 140.

Referring still to the example of FIG. 10, the forward flange 147*a* of the case 140 can define an inlet 144, instead of an outlet 145, to allow the fluid to enter the chamber 160, whereas the aft flange 147*b* of the case 140 can define an outlet 145, instead of an inlet 144, to allow the fluid to exit the chamber 160.

As mentioned, reducing the thermal capacity mismatch and/or the thermal time constant mismatch between the case 140 and the stage of rotor blades 110 can allow the clearance control assembly 100 to passively control the clearance D between the stage of rotor blades 110 and the shroud 120. Therefore, it may be beneficial to adjust the features, such as flanges 147, conductive elements 149, or flange depressions 148, of the components of the clearance control assembly 100 to reduce the thermal capacity mismatch and/or the thermal time constant mismatch. Reducing the thermal capacity mismatch and/or the thermal time constant mismatch allows the clearance control assembly to passively control the clearance D between the stage of rotor blades 110 and the shroud 120.

Also, it should be understood that discussed features can be incorporated into any example embodiments of clearance control assembly 100. For example, the flanges 147*a,d* or the flanges 147*b,c* of FIG. 3 can be incorporated into any of the other example embodiments; the depressions 148 of FIG. 4 can be incorporated into any of the other example embodiments; the conductive element 149 of FIG. 5 can be incorporated into any of the other example embodiments; the two-piece configuration of FIG. 6 can be incorporated into any of the other example embodiments; the rope seals 103, 104 of FIG. 9 can be incorporated into any of the other example embodiments; the inlet 144 and outlet 145 being defined by the flanges 147*a,b* as shown in FIG. 10 can be incorporated into any of the other example embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A clearance control assembly for a gas turbine engine, the gas turbine engine defining an axial direction and a radial direction and including a stage of rotor blades and a shroud hanger, the assembly comprising a case configured to be positioned outward along the radial direction from the stage of rotor blades when installed in the gas turbine engine, the case further configured to be engaged with the shroud hanger at a first location when installed in the gas turbine engine, and a baffle positioned outward along the radial direction from the case to define a chamber therebetween, the baffle having a forward end and an aft end, wherein the forward end of the baffle is engaged with the case to form a first seal, wherein the aft end of the baffle is engaged with the case to form a second seal, wherein the baffle, the case, or both define an inlet to allow a fluid to enter the chamber and the case defines an outlet to allow the fluid to exit the chamber.

2. The assembly of any preceding clause wherein the baffle defines the inlet, wherein the inlet is located proximate to a forward end of the baffle.

3. The assembly of any preceding clause, wherein the outlet is positioned aft of the first location and extends from an outer surface of the case to an inner surface of the case.

4. The assembly of any preceding clause, wherein the first seal comprises a first rope seal element positioned between the forward end of the baffle and the case, and wherein the second seal comprises a second rope seal element positioned between the aft end of the baffle and the case.

5. The assembly of any preceding clause, wherein the case includes a flange extending outward along the radial direction, and wherein the forward end or the aft end of the baffle engage with the flange of the case to form at least in part the first seal or the second seal.

6. The assembly of any preceding clause, wherein the shroud hanger has an aft hook that is configured to mate with a corresponding feature of the case, wherein the first location is a location where the aft hook of the shroud hanger mates with the corresponding feature of the case.

7. The assembly of any preceding clause, wherein the chamber extends continuously from the forward end of the baffle to the aft end of the baffle.

8. The assembly of any preceding clause, wherein the case defines an outer surface along the radial direction, and wherein the assembly further includes a conductive element positioned on the outer surface of the case and within the chamber.

9. The assembly of any preceding clause, wherein the case has a flange that extends outwardly along the radial direction and is located between the forward end of the baffle and the aft end of the baffle.

10. The assembly of any preceding clause, where the flange has a depression located near a root end of the flange.

11. A gas turbine engine defining an axial direction and a radial direction, the engine comprising a compressor section, a combustion section located downstream of the compressor section, and a turbine section located downstream of the combustion section, wherein the turbine section includes a stage of rotor blades, a shroud hanger, and a clearance control assembly, the clearance control assembly comprising a case positioned outward along the radial direction from the stage of rotor blades, the case engaged with the shroud hanger at a first location, and a baffle positioned outward along the radial direction from the case to form a chamber therebetween, the baffle having a forward end and an aft end, wherein the forward end of the baffle is engaged with the case to form a first seal, wherein the aft end of the baffle is engaged with the case to form a second seal, wherein the baffle or the case defines an inlet to allow a fluid to enter the chamber and the case defines an outlet to allow the fluid to exit the chamber.

12. The engine of any preceding clause, wherein the baffle defines the inlet, the inlet being located proximate to a forward end of the baffle.

13. The engine of any preceding clause, wherein the outlet is positioned aft of the first location and extends from an outer surface of the case to an inner surface of the case.

14. The engine of any preceding clause, wherein the first seal comprises a first rope seal element positioned between the forward end of the baffle and the case, and wherein the second seal comprises a second rope seal element positioned between the aft end of the baffle and the case.

15. The engine of any preceding clause, wherein the forward end or the aft end of the baffle engage with a flange that extends radially outward from the case to form at least in part the first seal or the second seal.

16. The engine of any preceding clause, wherein the shroud hanger has an aft hook that is configured to mate with a corresponding feature of the case, the first location being where the aft hook of the shroud hanger mates with the corresponding feature of the case.

17. The engine of any preceding clause, wherein the chamber extends continuously from the forward end of the baffle to the aft end of the baffle.

18. The engine of any preceding clause, further including a conductive element positioned on an outer surface of the case and within the chamber.

19. The engine of any preceding clause, wherein the case has a flange that extends radially outward and is located between the forward end of the baffle and the aft end of the baffle.

20. The engine of any preceding clause, where the flange has a depression located near a root end of the flange.

We claim:

1. A clearance control assembly for a gas turbine engine, the gas turbine engine defining an axial direction and a radial direction and including a stage of rotor blades and a shroud hanger, the assembly comprising:

a case defining a first flange and a second flange extending radially outwardly along the radial direction, wherein the first flange defines a forward wall face and an aft wall face and the second flange defines a forward wall face and an aft wall face, wherein the case is configured to be positioned outward along the radial direction from the stage of rotor blades when installed in the gas turbine engine, the case further configured to be engaged with the shroud hanger at a first location when installed in the gas turbine engine; and a baffle, wherein the baffle extends from the forward wall face of the first flange to the aft wall face of the second flange outward from the case, wherein the baffle, the case, the aft wall face of the first flange, and the forward wall face of the second flange define a chamber therebetween, the baffle having a forward end and an aft end, wherein the forward end of the baffle is engaged with the forward wall face of the first flange to form a first seal, and wherein the aft end of the baffle is engaged with the aft wall face of the second flange to form a second seal, wherein the baffle, the case, or both define an inlet to allow a fluid to enter the chamber and the case defines an outlet to allow the fluid to exit the chamber.

2. The assembly of claim 1, wherein the outlet is positioned aft of the first location and extends through the second flange.

3. The assembly of claim 1, wherein the first seal comprises a first rope seal element positioned between the forward end of the baffle and the first flange, and wherein the second seal comprises a second rope seal element positioned between the aft end of the baffle and the second flange.

4. The assembly of claim 1, wherein the shroud hanger has an aft hook that is configured to mate with a corresponding feature of the case, wherein the first location is a location where the aft hook of the shroud hanger mates with the corresponding feature of the case.

5. The assembly of claim 1, wherein the chamber extends continuously from the forward end of the baffle to the aft end of the baffle.

6. The assembly of claim 1, wherein the first flange and the second flange are located between the forward end of the baffle and the aft end of the baffle.

7. A gas turbine engine defining an axial direction and a radial direction, the engine comprising:

a compressor section;

a combustion section located downstream of the compressor section; and a turbine section located downstream of the combustion section, wherein the turbine section includes a stage of rotor blades, a shroud hanger, and a clearance control assembly, the clearance control assembly comprising:

a case defining a first flange and a second flange extending radially outwardly along the radial direction, wherein the first flange defines a forward wall face and an aft wall face, and the second flange defines a forward wall face and an aft wall face, wherein the case is positioned outward along the radial direction from the stage of rotor blades, the case engaged with the shroud hanger at a first location; and a baffle, wherein the baffle extends from the forward wall face of the first flange to the aft wall face of the second flange positioned outward from the case, wherein the baffle, the case, the aft wall face of the first flange, and the forward wall face of the second flange form a chamber therebetween, the baffle having a forward end and an aft end, wherein the forward end of the baffle is engaged with the forward wall face of the first flange to form a first seal, wherein the aft end of the baffle is engaged with the aft wall face of the second flange to form a second seal, wherein the baffle or the case defines an inlet to allow a fluid to enter the chamber and the case defines an outlet to allow the fluid to exit the chamber.

8. The engine of claim 7, wherein the outlet is positioned aft of the first location and extends through the second.

9. The engine of claim 7, wherein the first seal comprises a first rope seal element positioned between the forward end of the baffle and the first flange, and wherein the second seal comprises a second rope seal element positioned between the aft end of the baffle and the second flange.

10. The engine of claim 7, wherein the shroud hanger has an aft hook that is configured to mate with a corresponding feature of the case, the first location being where the aft hook of the shroud hanger mates with the corresponding feature of the case.

11. The engine of claim 7, wherein the chamber extends continuously from the forward end of the baffle to the aft end of the baffle.

12. The engine of claim 7, where the flange has a depression located near a root end of the flange.

* * * * *